United States Patent
Vasseur et al.

(10) Patent No.: US 8,588,108 B2
(45) Date of Patent: Nov. 19, 2013

(54) METHOD AND APPARATUS TO TRIGGER DAG REOPTIMIZATION IN A SENSOR NETWORK

(75) Inventors: Jean-Philippe Vasseur, Saint Martin dUriage (FR); Navneet Agarwal, Bangalore (IN); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 13/044,299

(22) Filed: Mar. 9, 2011

(65) Prior Publication Data

US 2012/0213124 A1   Aug. 23, 2012

(30) Foreign Application Priority Data

Feb. 21, 2011   (IN) .............................. 435/DEL/2011

(51) Int. Cl.
*H04L 12/28*   (2006.01)
(52) U.S. Cl.
USPC .......................................................... 370/255
(58) Field of Classification Search
USPC .......................................... 370/255, 254, 238
See application file for complete search history.

(56) References Cited

U.S. PATENT DOCUMENTS

| 6,006,254 | A  | * | 12/1999 | Waters et al. ................. 709/205 |
| 7,181,214 | B1 | * | 2/2007  | White ........................ 455/435.1 |
| 7,693,064 | B2 |   | 4/2010  | Thubert et al. |
| 7,860,025 | B2 |   | 12/2010 | Thubert et al. |
| 7,924,722 | B2 |   | 4/2011  | Thubert et al. |

(Continued)

FOREIGN PATENT DOCUMENTS

| GB | 2440575 A | * | 2/2008 |
| IN | 435/DEL/2001 |   | 2/2011 |

OTHER PUBLICATIONS

Agarwal, et al., Dynamic Directed Acyclic Graph (DAG) Topology Reporting, U.S. Appl. No. 12/790,028, filed May 28, 2010, 32 pages.
Thubert, et al., RPL Objective Function 0, IETF, Internet Draft, draft-ietf-roll-of0-03, Jul. 29, 2010, 10 pages.

(Continued)

*Primary Examiner* — Hassan Phillips
*Assistant Examiner* — Siren Wei
(74) *Attorney, Agent, or Firm* — Novak Druce Connolly Bove + Quigg LLP (57) ABSTRACT

In one embodiment, a probing technique allows a root node to determine whether to trigger reoptimization of a computer network represented by a directed acyclic graph (DAG) without injecting unnecessary traffic into the network. The root node may store and maintain information indicative of an ideal shape or topology of the DAG. During a normal DAG maintenance operation, the root node may transmit a DAG discovery request (probe request) that is configured to probe each node within the DAG for information used to determine a current topology of the DAG. In response, each node may record the information, e.g., routing and non-routing metrics, in a DAG discovery reply (probe reply) that is propagated to the root node. Upon receiving one or more replies, the root node may analyze the metrics to determine whether the current topology of the DAG deviates from the ideal DAG topology. The root node may thus determine DAG topology deviation upon probing at minimal cost. A number of algorithms may then be used to determine whether reoptimization, i.e., global repair, of the DAG is is required and, if so, the root node may dynamically trigger the global repair.

20 Claims, 4 Drawing Sheets

(56) References Cited

U.S. PATENT DOCUMENTS

| | | | |
|---|---|---|---|
| 2002/0144101 A1* | 10/2002 | Wang et al. | 712/240 |
| 2003/0020764 A1* | 1/2003 | Germain et al. | 345/853 |
| 2006/0200251 A1* | 9/2006 | Gu et al. | 700/1 |
| 2008/0080473 A1* | 4/2008 | Thubert et al. | 370/348 |
| 2008/0225771 A1* | 9/2008 | Guo et al. | 370/312 |
| 2010/0064049 A1* | 3/2010 | Magharei et al. | 709/229 |
| 2011/0116389 A1* | 5/2011 | Tao et al. | 370/252 |

OTHER PUBLICATIONS

Vasseur, et al., Routing Metrics used for Path Calculation in Lowe Power and Lossy Networks, IETF, Internet Draft, draft-ietf-roll-routing-metrics-17, Jan. 13, 2011, 31 pages.

Winter, et al., RPL: IPv6 Routing Protocol for Low Power and Lossy Networks, IETF, Internet Draft, draft-ietf-roll-rpl-18, Feb. 4, 2011, 159 pages.

* cited by examiner

METHOD AND APPARATUS TO TRIGGER DAG REOPTIMIZATION IN A SENSOR NETWORK

RELATED APPLICATION

The present application claims the benefit of Indian Application No. 435/DEL/2011, filed on Feb. 21, 2011, entitled METHOD AND APPARATUS TO TRIGGER DAG REOPTIMIZATION IN A SENSOR NETWORK, by Vasseur et al. The present application is also related to U.S. patent application Ser. No. 12/790,028, filed on May 28, 2010, entitled DYNAMIC DIRECTED ACYCLIC GRAPH (DAG) TOPOLOGY REPORTING, by N. Agarwal et al.

TECHNICAL FIELD

The present disclosure relates generally to computer networks, and, more particularly, to directed acyclic graph (DAG) routing and management, e.g., for Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or low processing capability of nodes. One example routing solution to LLN challenges is a protocol called Routing Protocol for LLNs or "RPL," which is a distance vector routing protocol that builds a Destination Oriented Directed Acyclic Graph (DAG) for an LLN in addition to a set of features to, among other things, bound control traffic and/or support local (and slow) repair. The RPL routing protocol provides a flexible method by which each node of the network performs DAG discovery, construction, and maintenance.

One problem that confronts LLNs is their stability in varying environments within which they are deployed. For example, in some environments, the links/nodes of the networks are relatively stable, whereas in other environments the level of instability is substantially greater. Furthermore, a particular network deployment may be stable for a period of time before experiencing a number of failures because of, e.g., changes in environmental conditions, thus necessitating local repair. Depending on the number of failures, many local repairs of the network may take place, leading to a DAG topology that is likely to become less optimal. Current solutions in RPL for addressing the optimality of a DAG include triggering a global repair manually or upon the expiration of a timer, which can be costly, inefficient and, in some situations, not actually needed.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a probing technique allows a root node to determine whether to trigger reoptimization of a computer network represented by a directed acyclic graph (DAG) without injecting unnecessary traffic into the network. During normal DAG maintenance operations, the root node may transmit specially configured DAG discovery requests (probe requests) that are configured to probe the nodes within the DAG for information used to determine shapes or topologies of the DAG. The nodes may record the information, e.g., routing and non-routing metrics, in specially configured DAG discovery replies (probe replies). The nodes may then return the replies to the root node which, upon receiving the replies, may compile the metrics to create a history of DAG information indicative of normal ("ideal") and abnormal DAG topologies. The root node may further store and maintain at least the metrics indicative of the ideal topology of the DAG.

Subsequently, during a normal DAG maintenance operation, the root node may transmit a probe request to probe each node within the DAG for information used to determine a current topology of the DAG. In response, each node may record current routing and non-routing metrics to a probe reply that is propagated to the root node. Upon receiving one or more replies, the root node may analyze the metrics to determine whether the current topology of the DAG deviates from the ideal DAG topology. The root node may thus determine DAG topology deviation upon probing at minimal cost. A number of algorithms may then be used to determine whether reoptimization, i.e., global repair, of the DAG is required and, if so, the root node may dynamically trigger the global repair.

Description

A computer network is a geographically distributed collection of nodes interconnected by communication links and segments for transporting data between end nodes, such as personal computers and workstations, or other devices, such as sensors. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a type of wireless ad-hoc network that is generally considered a self-configuring network of mobile routes (and associated hosts) connected by wireless links, the union of which forms an arbitrary topology.

Smart object networks, such as sensor networks in particular, are a specific type of network consisting of spatially distributed autonomous devices such as sensors that cooperatively monitor physical or environmental conditions at different locations, such as, e.g., temperature, pressure, vibration, sound, radiation, motion and/or pollutants. Other types of smart objects include actuators, e.g., objects responsible for turning on/off an engine or performing other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement and transmit that result) to the sensor sink. (Those skilled in the art will appreciate the benefits and shortcomings of each mode, and both apply to the techniques described herein.)

Figure 1:
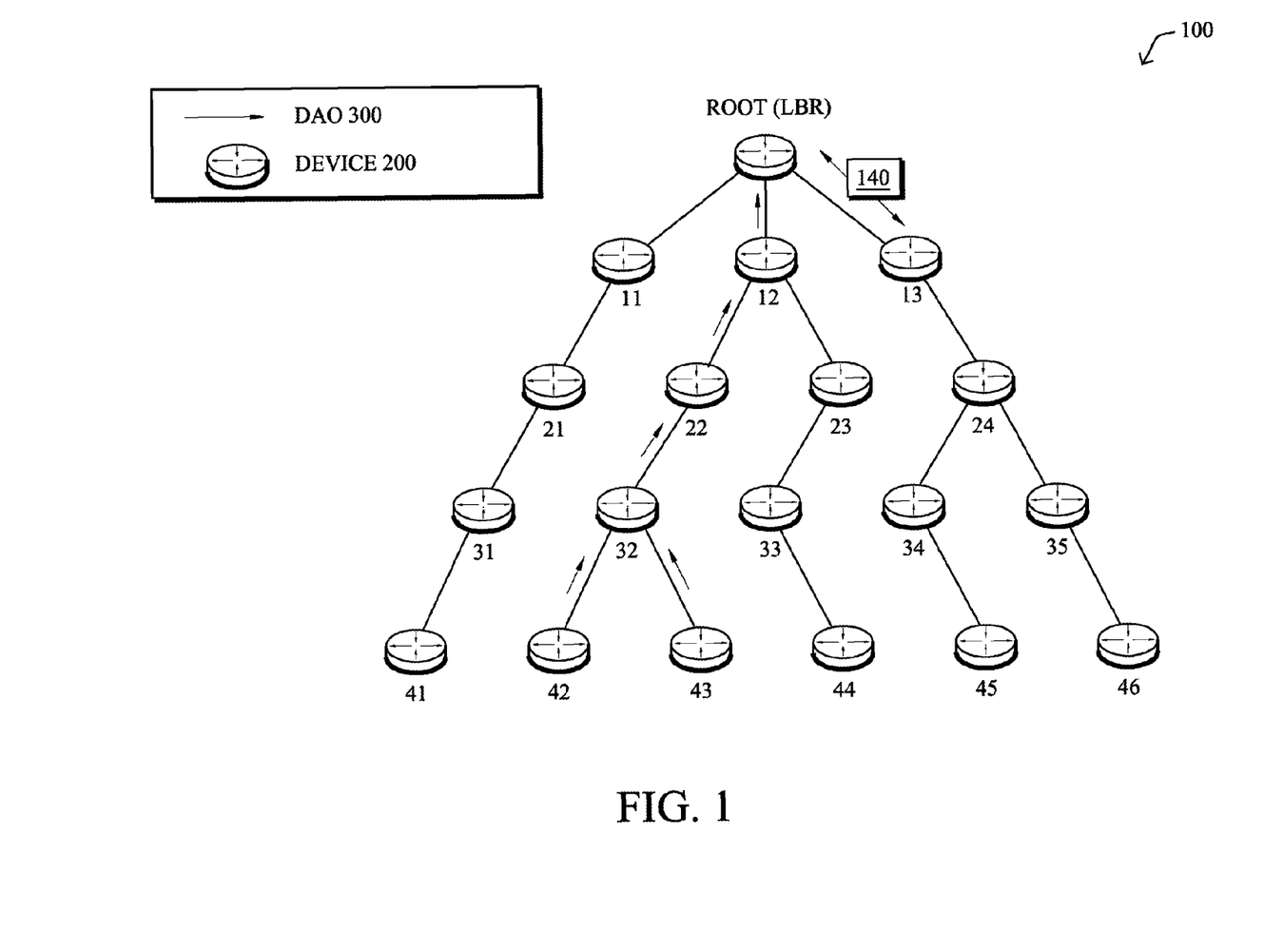
FIG. 1 illustrates an example computer network represented by a directed acyclic graph (DAG)

FIG. 1 is a schematic block diagram of an example computer network 100 illustratively comprising nodes/devices 200, such as, e.g., routers, sensors and/or computers, interconnected by various methods of communication, such as links, and labeled as shown (e.g., "LBR," "11," "12," . . . "46"). The links of the computer network may be wired links or may comprise a wireless communication medium, where certain nodes 200 of the network may be in communication with other nodes 200, e.g., based on distance, signal strength, current operational status and/or location. Those skilled in the art will understand that any number of nodes, devices, links, etc. may be used in the computer network, and that the view shown herein is for simplicity. Illustratively, certain devices in the network may be more capable than others, such as those devices having, e.g., larger memories and/or sustainable non-battery power supplies, versus those devices having minimal memory and/or battery power. For instance certain devices 200 may have no or limited memory capability. Also, one or more of the devices 200 may be considered root nodes/devices (or root capable devices) while one or more of the devices may also be considered destination nodes/devices.

Data packets 140 (e.g., traffic and/or messages sent between the devices/nodes) may be exchanged among the nodes/devices of the computer network 100 using predefined network communication protocols such as, among others, the Transmission Control Protocol/Internet Protocol (TCP/IP), User Datagram Protocol (UDP), Multi-Protocol Label Switching (MPLS) and/or various proprietary protocols. In this context, a protocol consists of a set of rules defining how the nodes interact with each other. In addition, packets within the network 100 may be transmitted in a different manner depending upon device capabilities, such as source routed packets.

Figure 2:
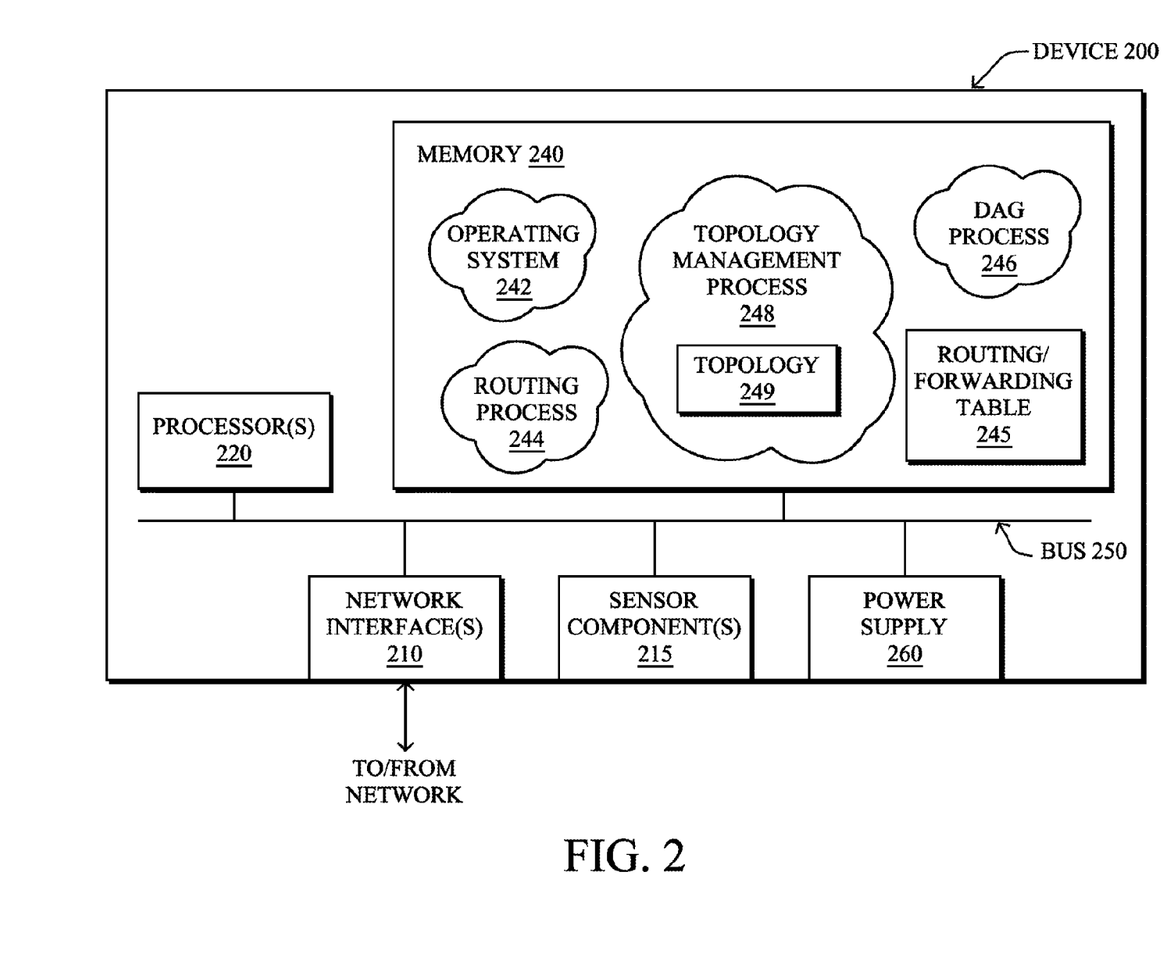
FIG. 2 illustrates an example network device/node.

FIG. 2 is a schematic block diagram of an example node/device 200 that may be used with one or more embodiments described herein, e.g., as a root node or sensor. The device may comprise one or more network interfaces 210, one or more sensor components 215 (e.g., sensors, actuators), a power supply 260 (e.g., battery, plug-in), one or more processors 220 (e.g., 8-64 bit microcontrollers), and a memory 240 interconnected by a system bus 250. The network interface(s) 210 contain the mechanical, electrical, and signaling circuitry for communicating data over physical and/or wireless links coupled to the network 100. The network interface(s) may be configured to transmit and/or receive data using a variety of different communication protocols, including, inter alia, TCP/IP, UDP, wireless protocols (e.g., IEEE Std. 802.15.4, WiFi, Bluetooth®), Ethernet and/or PLC protocols.

The memory 240 comprises a plurality of storage locations that are addressable by the processor(s) 220 and the network interface(s) 210 for storing software programs and data structures associated with the embodiments described herein. As noted above, certain devices may have limited memory or no memory (e.g., no memory for storage other than for programs/processes operating on the device). The processor(s) 220 may comprise necessary elements or logic adapted to execute the software programs and manipulate the data structures, such as routes or prefixes of a routing/forwarding table 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process (services) 244, which may include an illustrative directed acyclic graph (DAG) process 246. Also, for root devices (or other management devices), a topology management process 248 and associated topology 249 may be present in memory 240 for use as described herein. It will be apparent to those skilled in the art that other processor and memory types, including various computer-readable media, may be used to store and execute program instructions pertaining to the technique described herein. Also, while the description illustrates various processes, it is expressly contemplated that the various processes may be embodied as modules configured to operate in accordance with the technique herein (e.g., according to the functionality of a similar process).

Routing process/services 244 contains computer executable instructions executed by the processor(s) 220 to perform functions provided by one or more routing protocols, such as proactive or reactive routing protocols as will be understood by those skilled in the art. These functions may, on capable devices, be configured to manage routing/forwarding table 245 containing, e.g., information used to make routing/forwarding decisions. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR) and DYnamic MANET On-demand Routing (DYMO). Notably, on devices not capable or configured to store routing entries, routing process 244 may consist solely of providing mechanisms necessary for source routing techniques. That is, for source routing, other devices in the network can direct the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to low rate data traffic;

3) A number of use cases require specifying a set of link and node metrics, some of them being dynamic, thus requiring specific smoothing functions to avoid routing instability, considerably draining bandwidth and energy;

4) Constraint-routing may be required by some applications, e.g., to establish routing paths that avoid non-encrypted links and/or nodes running low on energy;

5) Scale of the networks may become very large, e.g., on the order of several thousands to millions of nodes; and 6) Nodes may be constrained with a low memory, a reduced processing capability and/or a low power supply (e.g., battery).

In other words, LLNs are a class of network in which both the routers and their interconnects are constrained; LLN routers typically operate with constraints, e.g., processing power, memory, and/or energy (battery), and their interconnects are characterized by, illustratively, high loss rates, low data rates, and/or instability. The LLN may be sized with devices ranging from a few dozen to as many as thousands or even millions of LLN routers, and may support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) is Internet Draft, entitled "RPL: IPv6 Routing Protocol for Low Power and Lossy Networks"<draft-ietf-roll-rpl-18> by Winter, at al. (Feb. 4, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or P2P traffic). RPL (pronounced "ripple") may generally be described as a distance vector routing protocol (e.g., executing as routing process 244 on nodes/devices in the LLN) that builds a Directed Acyclic Graph (DAG) for use in routing traffic/packets 140, in addition to defining a set of features to, e.g., bound the control traffic and/or support repair.

A DAG is a directed graph that represents a computer network, such as computer network 100, and that has the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG or DODAG (hereinafter generally denoted as "DAG") is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher the rank of that node). Further, a tree is a kind of DAG, where each device/node in the DAG generally has one parent or, as used herein, one preferred parent.

DAGs may generally be built based on an Objective Function (OF), the role of which is generally to specify rules on how to build the DAG (e.g., number of parents and/or backup parents). In addition, one or more metrics/constraints may be advertised by the routing protocol to optimize the DAG. The routing protocol may further include an optional set of constraints to compute a constrained path, such as when a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an OF or does not understand or support the advertised metric, it may be configured to join a DAG as a leaf node. As used herein, the various metrics, constraints and/or policies are considered DAG parameters.

Illustratively, example metrics used to select paths (e.g., preferred or "best" parents) may comprise cost, delay, latency, bandwidth and estimated transmission count (ETX), while example constraints that may be placed on the route selection may comprise various reliability thresholds, restrictions on battery operation, multipath diversity, load balancing requirements, bandwidth requirements, transmission types (e.g., wired, wireless), and also a number of selected parents (e.g., single parent trees or multi-parent DAGs). Notably, an example of how routing metrics may be obtained may be found in an IETF Internet Draft, entitled "Routing Metrics used for Path Calculation in Low Power and Lossy Networks"<draft-ietf-roll-routing-metrics-17> by Vasseur, et al. (Jan. 13, 2011 version). Further, an example OF (e.g., a default OF) may be found in an IETF Internet Draft, entitled "RPL Objective Function 0"<draft-ietf-roll-of0-03> by Thubert (Jul. 29, 2010 version).

Building of a DAG may utilize a discovery mechanism to build a logical representation of the network, and route dissemination to establish state within the network so that routers know how to forward packets toward their ultimate destinations. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DAG Information Object (DIO) is a type of DAG discovery request message that carries information that allows a node to discover an RPL Instance, learn its configuration parameters, select a DAG parent set, and maintain the upward routing topology. In addition, a Destination Advertisement Object (DAO) is a type of DAG discovery reply message that conveys destination information upwards along the DAG so that a DAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward (UP) direction toward the root device. The DAG discovery reply (e.g., DAO) message may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DAG root which can, in turn, build the topology and locally compute downward routes to all nodes in the DAG. Such nodes are then reachable using source routing techniques over regions of the DAG that are incapable of storing downward routing state.

Figure 3:
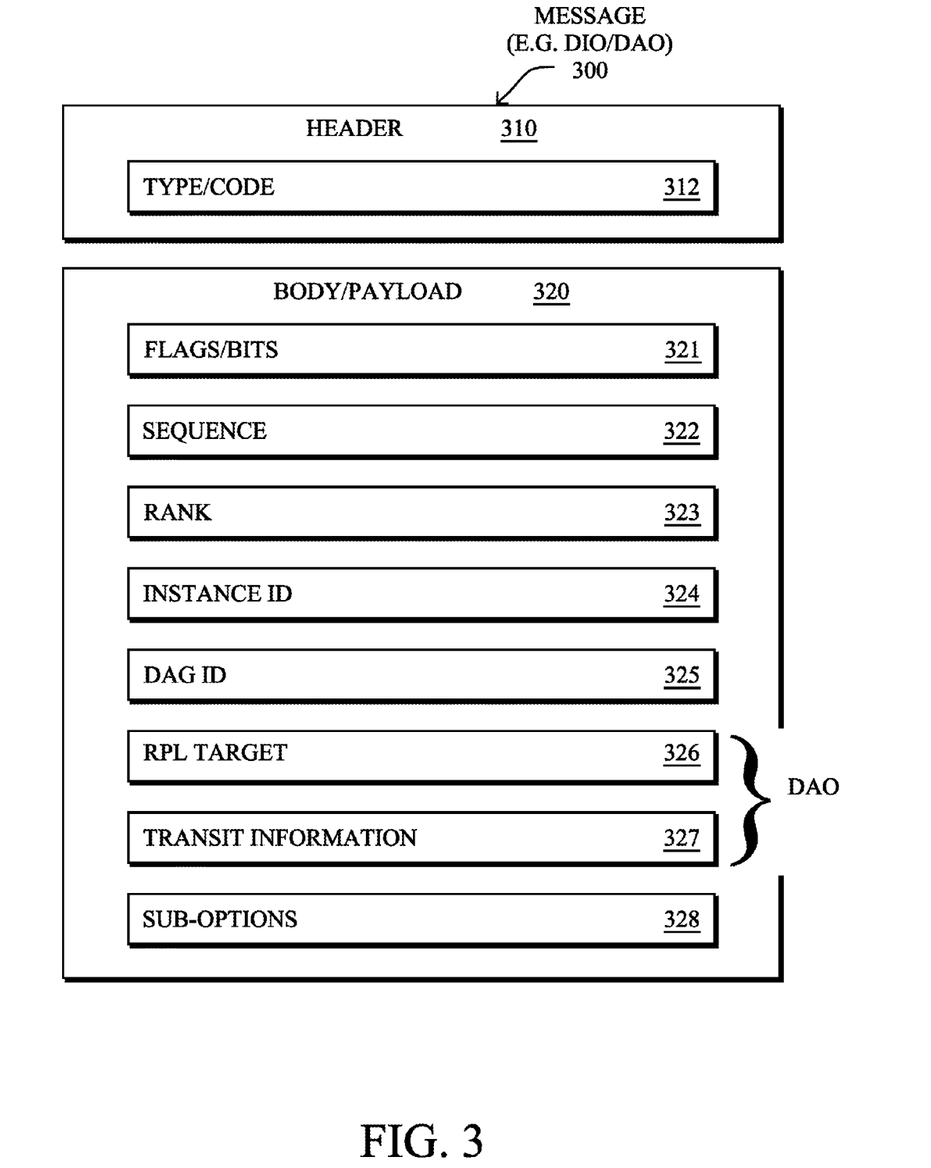
FIG. 3 illustrates an example message.

FIG. 3 illustrates an example message 300 with a simplified control message format that may be used for discovery and route dissemination when building a DAG, e.g., as a DIO or DAO message. Message 300 illustratively comprises a header 310 having one or more fields 312 that identify the type of message (e.g., a RPL control message) and a specific code indicating the specific type of message, e.g., a DIO or a DAO (or a DAG Information Solicitation). A body/payload 320 of the message may comprise a plurality of fields used to relay pertinent information. In particular, the fields may comprise various flags/bits 321, a sequence number 322, a rank value 323, an instance ID 324, a DAG ID 325, and other fields, each as may be appreciated in more detail by those skilled in the art. Further, for DAO messages, a RPL target field 326 is used to record one or more destination prefixes and an optional transit information field 327 may be used to record one or more parents. For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG.

As noted above, one problem that confronts LLNs is their stability in the varying environments within which they are deployed. Because of changes in the conditions of such environments, a particular network deployment may experience failures such as when a device/node attempts to send message traffic to a parent node that does not respond, resulting in loss of connectivity between the node and its parent. In the course of establishing a new parent with which to connect, the node may attach to a different node with a higher rank in the DAG, i.e., the different node may be using the node as an ancestor and, thus, may be part of the node's sub-DAG. Connectivity with this different node may result in the formation of a loop in the network. In order to avoid the formation of such a loop, a node may notify the higher rank nodes in its sub-DAG to stop forwarding traffic to it, thereby "poisoning" the sub-DAG. Such failures may require many local repairs or attempts to restore connectivity of the node by selecting yet another node in its (local) vicinity of the network. However, selection of this latter node may not represent the best path that could have been selected if the entire DAG was rebuilt. Accordingly, the local repairs may lead to a DAG topology that is likely to be less optimal.

Solutions for addressing the optimality of a DAG include, among others, triggering of a global repair operation manually or using aggressive global reoptimization timers, i.e., increasing the frequency at which RPL control plane signaling messages are transmitted into the LLN. Furthermore, global repairs may have an impact on the nodes in the network (additional processing, energy consumption) and on the traffic (jitter). As used herein, a global repair is a complete rebuild of the DAG, which is triggered by the root node incrementing a sequence number (e.g., in field 322 of message 300) for the DAG. However, there is generally no way for the root node to know whether a global repair is necessary. Therefore, if there were no changes to the metrics reported by the nodes of the DAG, then the rebuilt DAG topology may be identical to the current DAG topology and the global repair was not actually needed.

It should be noted that global repair in the LLN is similar in concept to global reoptimization in, e.g., a conventional IP/MPLS network. In such a network, a Path Computation Element (PCE) may decide to re-arrange a set of primary tunnels to globally reoptimize MPLS traffic placement. However, the cost of such operation is typically not an issue in an IP/MPLS network. That is, unlike the LLN that may deploy low bandwidth and lossy links, the IP/MPLS network generally deploys more stable links that are not bandwidth constraint. Furthermore, unlike a DAG node that may incorporate low resource (e.g., battery, memory and processing) capabilities, the PCE is generally not so resource constraint and, thus, is capable of processing and maintaining information regarding the status or condition of events. This is also true for the various routers in the networks. Therefore, triggering of a global repair operation in an LLN can be costly, e.g., in terms of processing of the resulting control plane traffic that further significantly reduces the bandwidth available for data traffic for a period of time, and requires processing on the nodes that are part of the DAG rebuilding process.

DAG Reoptimization Trigger

According to one or more embodiments herein, therefore, a method and apparatus are described to dynamically trigger global repair/reoptimization of a computer network, such as an LLN, represented by a DAG when it is determined that such repair is needed. Specifically, according to one or more embodiments of the disclosure, a probing technique allows a root node to determine whether to trigger reoptimization of the DAG without injecting unnecessary traffic into the network. During normal DAG maintenance operations, the root node may transmit specially configured DAG discovery requests (probe requests) that are configured to probe the nodes within the DAG for information used to determine shapes or topologies of the DAG. The nodes may record the information, e.g., routing and non-routing metrics, in specially configured DAG discovery replies (probe replies). The nodes may then return the replies to the root node which, upon receiving the replies, may compile the metrics to create a history of DAG information indicative of normal ("ideal") and abnormal DAG topologies. The root node may further store and maintain at least the metrics indicative of the ideal topology of the DAG.

Subsequently, during a normal DAG maintenance operation, the root node may transmit a probe request to probe each node within the DAG for information used to determine a current topology of the DAG. In response, each node may record current routing and non-routing metrics to a probe reply that is propagated to the root node. Upon receiving one or more replies, the root node may analyze the metrics to determine whether the current topology of the DAG deviates from the ideal DAG topology. The root node may thus determine DAG topology deviation upon probing at minimal cost. A number of algorithms may then be used to determine whether reoptimization, i.e., global repair, of the DAG is required and, if so, the root node may dynamically trigger the global repair.

Illustratively, the techniques described herein may be performed by hardware, software, and/or firmware, such as in accordance with topology management process 248 for root node functionality, which may contain computer executable instructions executed by the processor(s) 220 to perform functions relating to the novel technique described herein, e.g., in conjunction with routing process 244 and DAG process 246.

Operationally, a root node (e.g., a LBR) may initiate the probing technique to determine whether or not the current topology of the DAG, e.g., at a particular point in time, diverges significantly from the ideal DAG topology. Initiation of the probing technique illustratively occurs during normal DAG maintenance operations and, to that end, illustratively employs a DAG discovery request, e.g., a DIO message 300, that is transmitted periodically by the root node to the nodes of the DAG in order to, for example, obtain routing metrics used to reoptimize or otherwise build the DAG. Periodic transmission of the DIO message occurs in the LLN because certain routing metrics, such as reliability, delay or throughput of a link advertised by a DAG node, may change due to the network's varying environment or because of topology changes. It should also be noted that active probing may occur in response to the root node receiving a burst of unsolicited messages from DAG nodes reporting topology changes in the LLN.

According to one or more embodiments herein, the DIO message 300 is generated by the root node and configured with a special flag, i.e., an asserted probe flag or "P" flag, within the flags field 321. Assertion of the P flag illustratively transforms the DIO message to a discovery request that, upon transmission into the LLN, is configured to also probe each device/node within the DAG for information used to determine shapes or topologies of the DAG. Advantageously, use of a specially configured DIO message 300 (i.e., a "probe request") avoids extra control plane traffic needed to probe the nodes for DAG topology information. DAG probing is illustratively triggered when DIO timers are reset and RPL performs its normal DAG operations.

Upon receiving a probe request, each node in the DAG is requested to perform its usual parent selection process to determine whether a better parent node (i.e., a best parent) may be available in the network. For example, a DAG node (an advertising router) executing RPL advertises a number of parameters including a set of path costs (if using more than one metric and constraint). Each node in the vicinity of the advertising router may then determine whether a best parent is available by, e.g., computing a locally estimated link cost to that parent. A threshold based cost update may be used to stabilize the LLN by, e.g., minimizing the routing traffic and energy used by the routing protocol with too frequent topology changes.

In response to selecting one or more best parents (e.g., in the case of path diversity and/or load balancing) or to receiving the probe request, the node generates a DAG discovery reply, e.g., a DAO message 300, that is also specially configured (e.g., with the asserted P flag within the flags field 321) as a "probe reply" to record the requested information, e.g., both routing and non-routing metrics. Specifically, each node provides a set of reachable prefixes, e.g., in field 326, from nodes in the DAG used for downward routing and for population in the routing tables of upper nodes in the DAG. The node may also record (e.g., in field 328) one or more computed routing metrics, such as ETX, as well as possibly other non-routing metrics that can hint at the how much the DAG topology may deviate from the ideal topology. These non-routing metrics may include parent changes experienced by the node, the existence of a potentially more optimal parent (e.g., in field 327), as well as physical mobility of the node (e.g., how often a sensor is moved from location to location in the network.) Note that these non-routing metrics may be manifested by, e.g., the node recording a rate at which it changes parents or is physically moved. The node then returns the probe reply to the root node. As the reply propagates in an upward direction of the DAG, (compressed) host addresses may be recorded by other nodes into the message 300 and the recorded information (metrics) may be aggregated and eventually presented to the root node.

The root node may compile the metrics received from the DAG nodes to create a history of DAG information (e.g., events) indicative of both normal ("ideal") and abnormal network topologies/shapes. Illustratively, the root node may create the history of DAG event information using topology management process 248, with at least one resulting network topology (i.e., the ideal topology) stored and maintained as one or more topologies 249 in memory 240. Such a history may enable the root node to better understand the state or "health" of the DAG under normal/ideal conditions in addition to when its health may become abnormal. According to one or more embodiments disclosed herein, the information indicative of the ideal topology of the DAG may be further maintained by the root node using previous DAO messages generated by the nodes when reporting their local parents. That is, the root node may correlate this previous topology information with the aggregated metric information obtained via probing so as to avoid duplicate (double) accounting of branches in the DAG traversed by the same set of DAO messages.

Subsequently, during a normal DAG maintenance operation, the root node may transmit a (subsequent) probe request to probe each node within the DAG for information used to determine a current topology of the DAG. In response, each node may record current routing and non-routing metrics to a (subsequent) probe reply that is propagated to the root node. Upon receiving one or more replies, the root node may analyze the metrics to determine whether the current topology of the DAG substantially deviates from the ideal DAG topology. More specifically, the DAG root node may compare the current metrics indicative of the current DAG topology with the maintained metrics indicative of the ideal DAG topology to assess a degree of deviation, if any. As a result, the root node may determine DAG topology deviation upon probing at minimal cost, i.e., probing performed during normal DAG maintenance operations.

The root node may then use (i.e., invoke) one of a number of algorithms to determine whether reoptimization, i.e., global repair, of the DAG should be triggered. According to one or more embodiments disclosed herein, these algorithms may be used to determine whether the current topology of the DAG substantially deviates from the ideal DAG topology, e.g., according to a predetermined threshold. For example, the root node may determine that, based on the DAG information history, there is an unusual increase (i.e., in excess of a predetermined threshold) in the rate of parent change (resulting in local repairs) as currently reported by one or more nodes in the network. Accordingly, the root node may dynamically trigger a global repair operation. In addition, the root node may determine that global repair is needed when the sum of link costs in the DAG (i.e., the DAG cost) exceeds an average cost by a predetermined percentage. In this context, the link costs may illustratively include the actual expense incurred to traverse a particular type of link in the network, the throughput associated with the type of link, and/or the delay associated with the link. Global repair may also be needed when the DAG cost exceeds a predetermined maximum threshold or exceeds a variance by some predetermined percentage. Situations that may further require global repair include when portions of the network experience unusually high churn in their parent selection, as well as when nodes capable of providing physical location information indicate the occurrence of significant changes in those locations.

Figure 4:
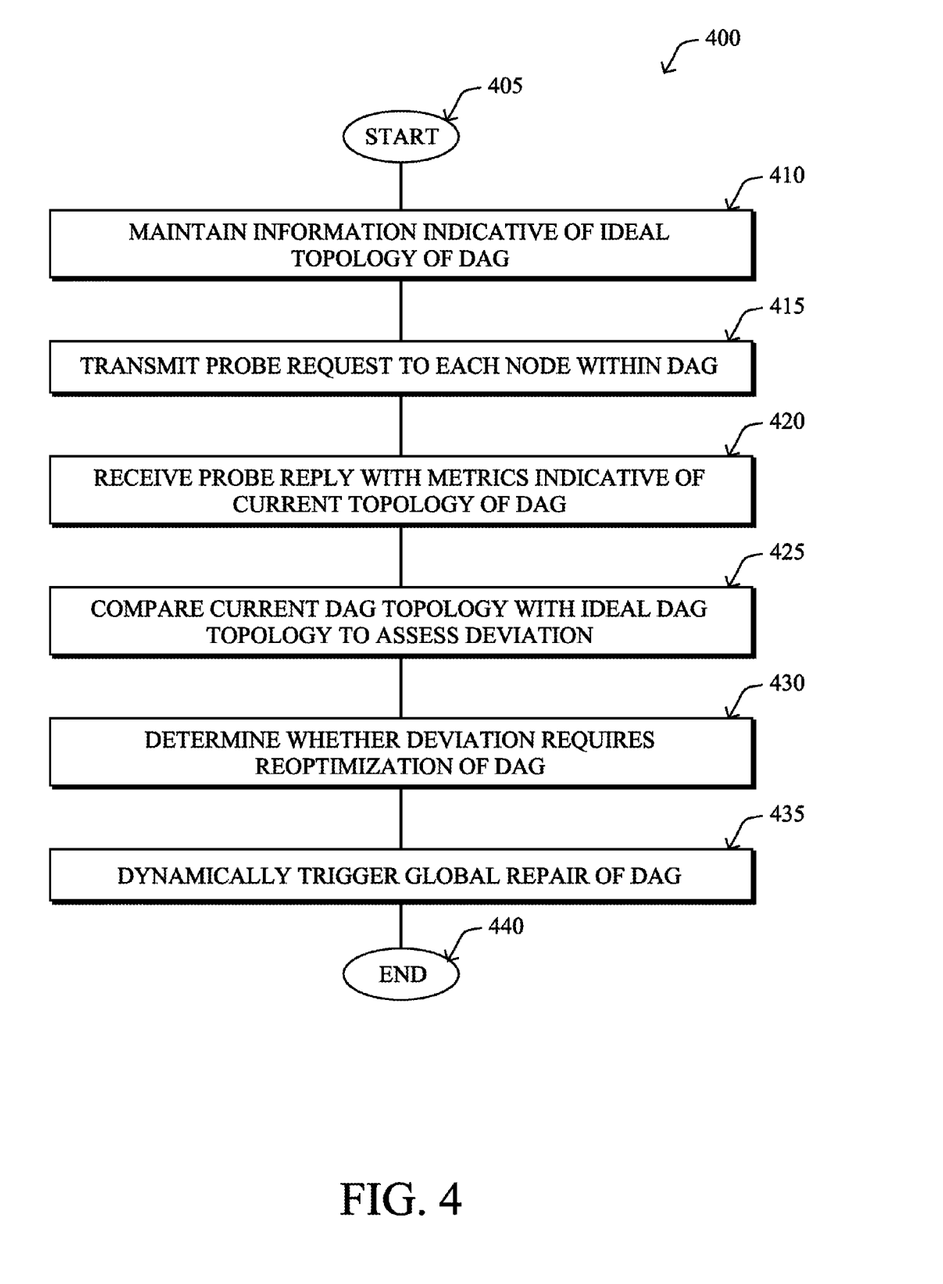
FIG. 4 illustrates an example simplified procedure for dynamically triggering reoptimization of the DAG.

FIG. 4 illustrates an example simplified procedure for dynamically triggering reoptimization of the DAG in accordance with one or more embodiments described herein. The procedure 400 starts at step 405 and continues to step 410 where a root node of a computer network represented by a DAG maintains information indicative of an ideal topology of the DAG (including information about the average DAG cost). In step 415, during a normal DAG maintenance operation, the root node may transmit a DAG discovery request (i.e., a probe request) to each node of the DAG, wherein the probe request is configured to probe the node for information, e.g., routing and non-routing metrics, indicative of a current topology of the DAG. In step 420, the root node may receive a DAG discovery reply (i.e., a probe reply) from the node in response to the discovery request, wherein the probe reply is configured to record the metrics. The root node may then analyze the received metrics to determine whether the current topology of the DAG deviates from the ideal DAG topology according to a predetermined threshold. That is, in step 425, the root node may compare the metrics indicative of the current DAG topology with the maintained information indicative of the ideal DAG topology to assess the deviation, if any. In step 430, the root node may then invoke an algorithm to determine whether the deviation necessitates (requires) reoptimization, i.e., global repair, of the DAG. If so, in step 435, the root node dynamically triggers global repair of the DAG and the procedure 400 ends in step 440.

The novel technique described herein dynamically triggers DAG global re-pair/reoptimization when it is determined that such repair is needed. In particular, as de-scribed above, a probing technique is provided that allows a root node/device executing RPL during normal maintenance operation to determine whether to trigger reoptimization of a DAG of an LLN without injecting unnecessary traffic into the network. By observing the history of DAG events, as manifested by various parameters/metrics (e.g., smoothing average with variance and/or thresholds) received from nodes in the DAG, the root node may decide when performance of a global repair of the DAG is required. More specifically, the novel technique enables the root node to perform a global repair of the DAG only when needed, as opposed to relying on a fixed timer. Therefore, global repair (a costly operation in LLNs) may be dynamically triggered, thereby improving optimization of network maintenance operations.

While there have been shown and described illustrative embodiments that dynamically trigger DAG global repair/reoptimization in a computer network, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not so limited, and may, in fact, be used with other types of networks and/or protocols utilizing DAG routing (e.g., distance vector protocols).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining information at a root node of a computer network represented by a directed acyclic graph (DAG), the information indicative of an ideal DAG topology;
   transmitting a discovery request from the root node to each node of the DAG, the discovery request configured to probe the node for metrics indicative of a current topology of the DAG, wherein the metrics include at least one of routing metrics and non-routing metrics;
   receiving a discovery reply at the root node from the node in response to the discovery request, the discovery reply configured to record the metrics;
   analyzing the metrics, indicative of the current topology of the DAG, at the root node to determine whether the current topology of the DAG deviates from the ideal DAG topology according to a predetermined threshold, in order to determine whether global repair of the DAG at the root node should be dynamically triggered; and
   in response to determining the current topology of the DAG deviates from the ideal DAG topology according to the predetermined threshold, dynamically triggering global repair of the DAG at the root node.

2. The method as in claim 1, wherein transmitting of the discovery request occurs during normal DAG maintenance operation.

3. The method as in claim 1, wherein the discovery request is a DAG Information Object (DIO) message and wherein transmitting comprises:
   generating the DIO message at the root node; and
   configuring the DIO message with an asserted probe flag.

4. The method as in claim 1, wherein the discovery reply is a Destination Advertisement Object (DAO) message and wherein receiving comprises:
   receiving the DAO message configured with an asserted probe flag.

5. The method as in claim 1, wherein the non-routing metrics include a rate of parent change experienced by the node.

6. The method as in claim 1, wherein the non-routing metrics include a rate of physical mobility of the node.

7. The method as in claim 1, wherein analyzing comprises:
   comparing the metrics indicative of the current topology of the DAG with the information indicative of the ideal DAG topology to assess a deviation.

8. The method as in claim 7, wherein analyzing further comprises:

determining whether the deviation necessitates reoptimization of the DAG.

9. The method as in claim 1, wherein analyzing comprises:
determining that the global repair is needed when a sum of link costs in the DAG exceeds an average cost by a predetermined percentage.

10. An apparatus, comprising:
one or more network interfaces connected to a computer network represented by a directed acyclic graph (DAG);
a processor coupled to the network interfaces and adapted to execute one or more processes; and
a memory configured to store a process executable by the processor, the process when executed operable to:
maintain information indicative of an ideal topology of the DAG;
transmit a discovery request to each node of the DAG, the discovery request configured to probe the node for metrics indicative of a current topology of the DAG, wherein the metrics include at least one of routing metrics and non-routing metrics;
receive a discovery reply from the node in response to the discovery request, the discovery reply configured to record the metrics;
analyze the metrics, indicative of the current topology of the DAG, to determine whether the current topology of the DAG deviates from the ideal topology of the DAG according to a predetermined threshold, in order to determine whether global repair of the DAG should be dynamically triggered; and
in response to determining the current topology of the DAG deviates from the ideal DAG topology according to the predetermined threshold, dynamically trigger global repair of the DAG.

11. The apparatus as in claim 10, wherein the process when executed is further operable to:
transmit the discovery request during normal DAG maintenance operation.

12. The apparatus as in claim 10, wherein the discovery request is a DAG Information Object (DIO) message and wherein the process when executed is further operable to:
generate the DIO message; and
configure the DIO message with an asserted probe flag.

13. The apparatus as in claim 10, wherein the discovery reply is a Destination Advertisement Object (DAO) message and wherein the process when executed is further operable to:
receive the DAO message configured with an asserted probe flag.

14. The apparatus as in claim 10, wherein the non-routing metrics include a rate of parent change experienced by the node.

15. The apparatus as in claim 10, wherein the non-routing metrics include a rate of physical mobility of the node.

16. The apparatus as in claim 10, wherein the process when executed is further operable to:
compare the metrics indicative of the current topology of the DAG with the information indicative of the ideal topology of the DAG to assess a deviation.

17. The apparatus as in claim 16, wherein the process when executed is further operable to:
determine whether the deviation necessitates reoptimization of the DAG.

18. The apparatus as in claim 10, wherein the process when executed is further operable to:
determine that the global repair is needed when a sum of link costs in the DAG exceeds a predetermined maximum threshold.

19. The apparatus as in claim 18, wherein the link costs include one of an expense incurred to traverse a type of link in the network, a throughput associated with the type of link, and a delay associated with the link.

20. A method, comprising:
transmitting probe requests from a root node to nodes of a computer network represented by a directed acyclic graph (DAG), the probe requests configured to probe the nodes for information used to determine topologies of the DAG;
receiving probe replies from the nodes at the root node, the probe replies configured to record the information;
compiling the information at the root node to create a history of DAG information indicative of at least an ideal DAG topology;
maintaining the ideal DAG topology at the root node;
transmitting a subsequent probe request from the root node to each node within the DAG during a maintenance operation to probe the node for metrics used to determine a current topology of the DAG, wherein the metrics includes at least one of routing metrics and non-routing metrics;
receiving a subsequent probe reply at the root node from the node, the subsequent probe reply configured to record the metrics;
analyzing the metrics, used to determine the current topology of the DAG, at the root node to determine whether the current topology of the DAG substantially deviates from the ideal DAG topology, in order to determine whether global repair of the DAG at the root node should be dynamically triggered; and
in response to determining the current topology of the DAG deviates from the ideal DAG topology according to the predetermined threshold, dynamically triggering global repair of the DAG at the root node.

* * * * *